Patented Feb. 18, 1930

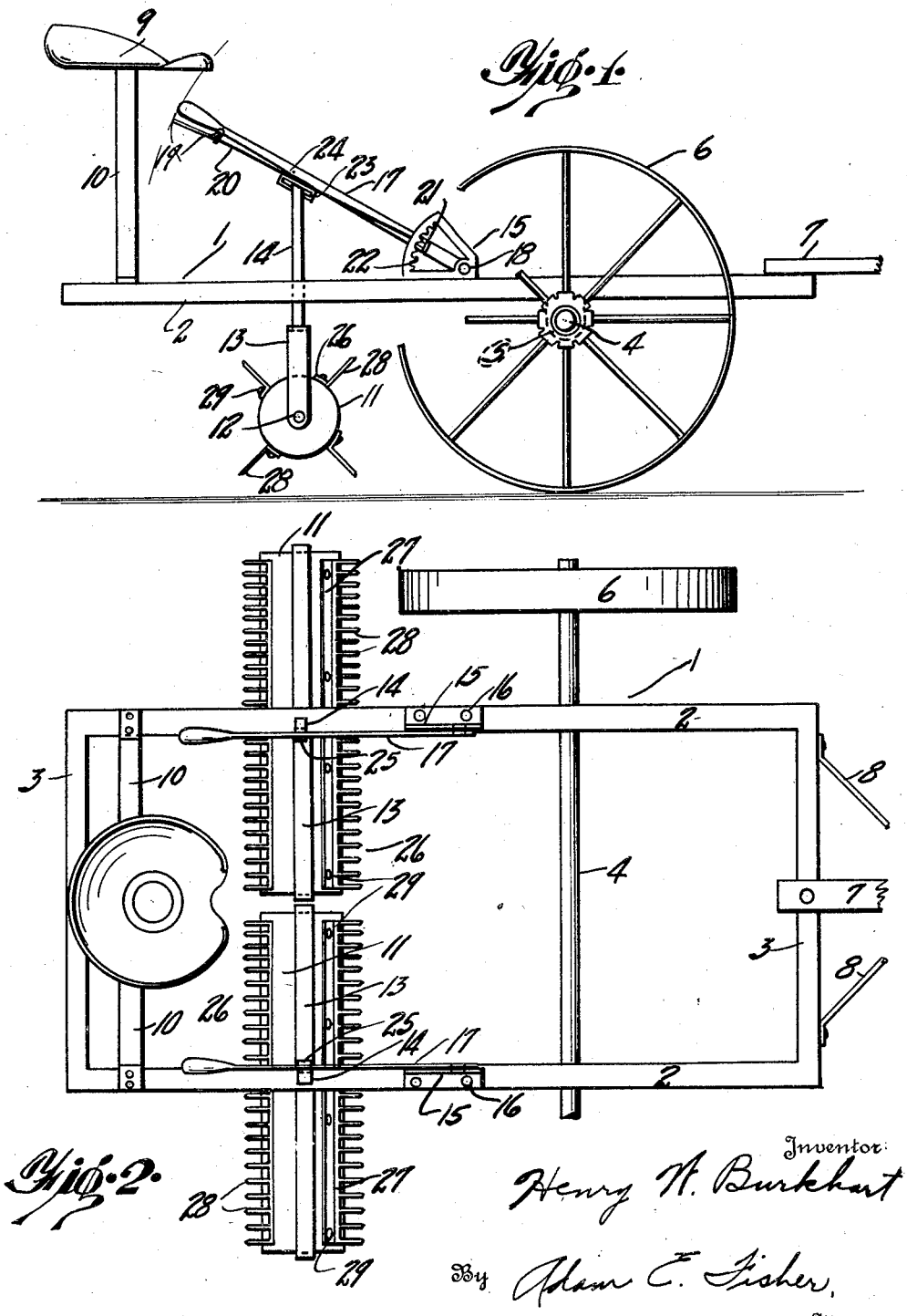

1,747,753

UNITED STATES PATENT OFFICE

HENRY W. BURKHART, OF KNOXVILLE, TENNESSEE

MULCHER

Application filed September 29, 1928. Serial No. 309,314.

This invention relates to agricultural implements of the class generally known as mulchers which are used in the preparation of the soil for planting and for cultivating.

The main object of the invention is to provide, in a simple and durable form, a mulcher having removable soil working teeth upon vertically adjustable carrying elements so that the teeth may be raised from contact with the ground when traveling from field to field and also so that the depth which the teeth enter into the soil may be varied according to the nature of the work in progress.

A further object of the invention is to provide a machine of this character which employs a minimum number of parts and is consequently readily and cheaply manufactured and not liable to derangement in use.

The foregoing and other objects of the invention together with means whereby the same may be carried into effect will best be understood from the following description of one embodiment of the invention taken in connection with the accompanying drawing in which:

Figure 1 is a side view of the invention; and
Figure 2 is a plan view thereof.

In carrying out the invention I provide a substantially rectangular frame 1 of suitable material such as angle iron or the like and comprising the side rails 2 and the front and rear rails 3. An axle 4 is journaled transversely across the frame 1 in bearings 5 beneath the side rails 2 and large supporting wheels 6 are mounted upon the ends thereof. Any conventional arrangement of draft elements may be employed such as the tongue 7 and brace rods 8. A driver's seat 9 is supported on legs 10 secured to the sides 2 adjacent the rear of the frame.

Elongated cylindrical mulcher drums or mulcher teeth bearing elements 11 are provided and the same are journaled upon shafts 12 passed through the ends of the inverted U-shaped hangers 13. Vertical shafts 14 are secured to a medial point of the U-shaped hangers 13 and are slidably passed upwardly through suitable laterally aligned sockets formed in the side rails 2 in the rear portions thereof. These shafts 14 are preferably square in cross section so that the mulcher drums 11 and hangers 13 cannot rotate as will be understood. Lever pivot plates 15 are secured by bolts 16 to the side rails 2 at a point spaced forwardly from the shafts 14 and levers 17 are pivoted at 18 thereto. These levers 17 are provided with the conventional adjusting handles 19 connected by rods 20 to the pawls 21 which engage the teeth 22 on the pivot plates 15. The shanks of the levers 17 are provided with offset extensions 23 having slots 24 and the upper ends of the shafts 14 are provided with angularly bent fingers 25 adapted to engage these slots in such manner that by raising or lowering these levers the mulcher drums 11 will be raised or lowered as will be understood.

Mulcher teeth units 26 comprising base members 27 and spaced teeth 28 are secured at equally spaced intervals around the drums 11 by bolts 29 so that the teeth project radially therefrom as shown.

From the foregoing it will be readily apparent that the mulcher drums and teeth may be raised and lowered at will and also that teeth of various shape and size may be used according to the work to be done.

While I have herein set forth a certain embodiment of my invention it is understood that I may vary from the same in minor structural details so as best to construct a practical device for the purposes intended, not departing from the spirit of the invention and within the scope of the appended claim.

I claim:

In a device of the character described, a wheel borne frame, U-shaped hangers with vertically extended shafts slidably mounted through the frame, the upper ends of the said shafts being angularly bent in the form of extended fingers, mulcher drums journaled in the said U-shaped hangers, mulcher teeth units comprising base portions and extended spaced teeth removably secured upon the said drums by their base portions and adjusting levers pivoted upon the frame and having slots to receive the extended fingers upon the vertical shafts whereby the mulcher teeth may be raised or lowered.

In testimony whereof I affix my signature.

HENRY W. BURKHART.